(No Model.) 4 Sheets—Sheet 1.
E. T. GREENFIELD.
ELECTRICAL CONDUIT.
No. 461,677. Patented Oct. 20, 1891.
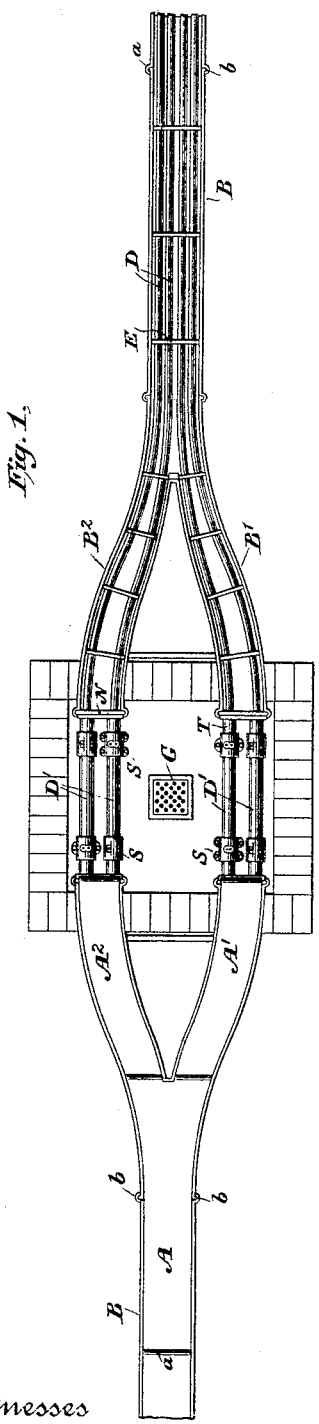
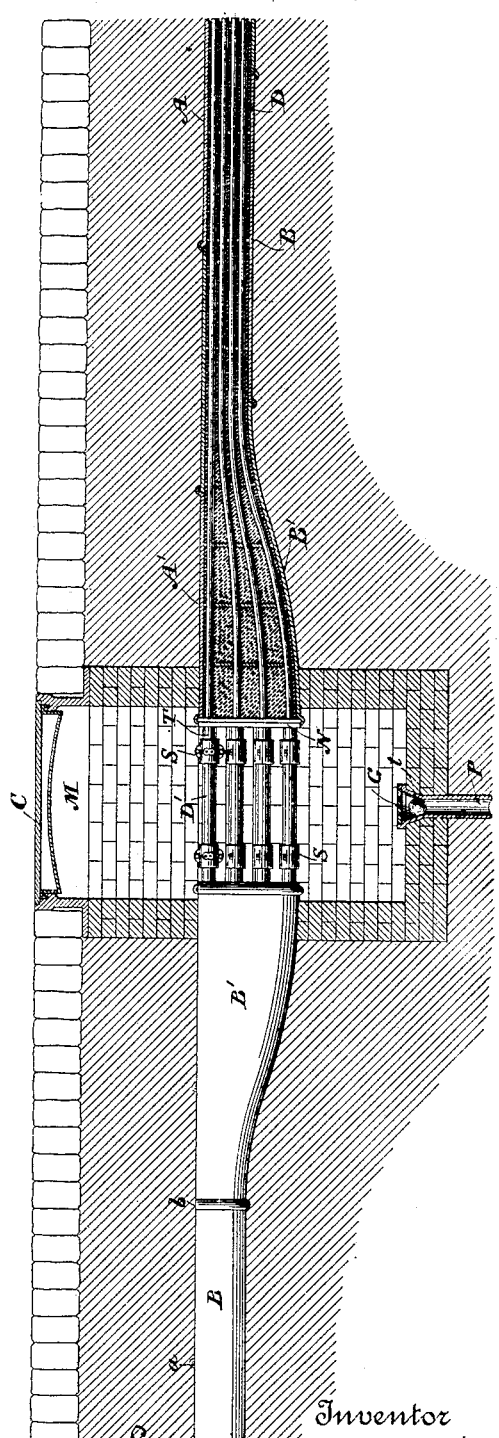
Witnesses
Geo. W. Breck.
Henry W. Lloyd.
Inventor
Edwin T. Greenfield
By his Attorney
Charles J. Kintner (No Model.) 4 Sheets—Sheet 2.
E. T. GREENFIELD.
ELECTRICAL CONDUIT.
No. 461,677. Patented Oct. 20, 1891.
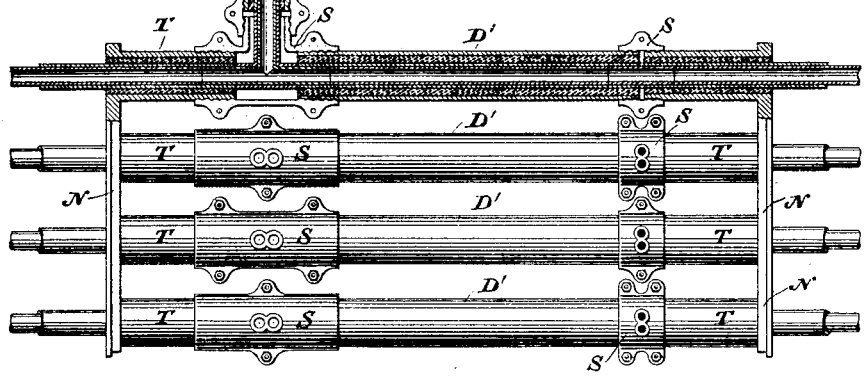
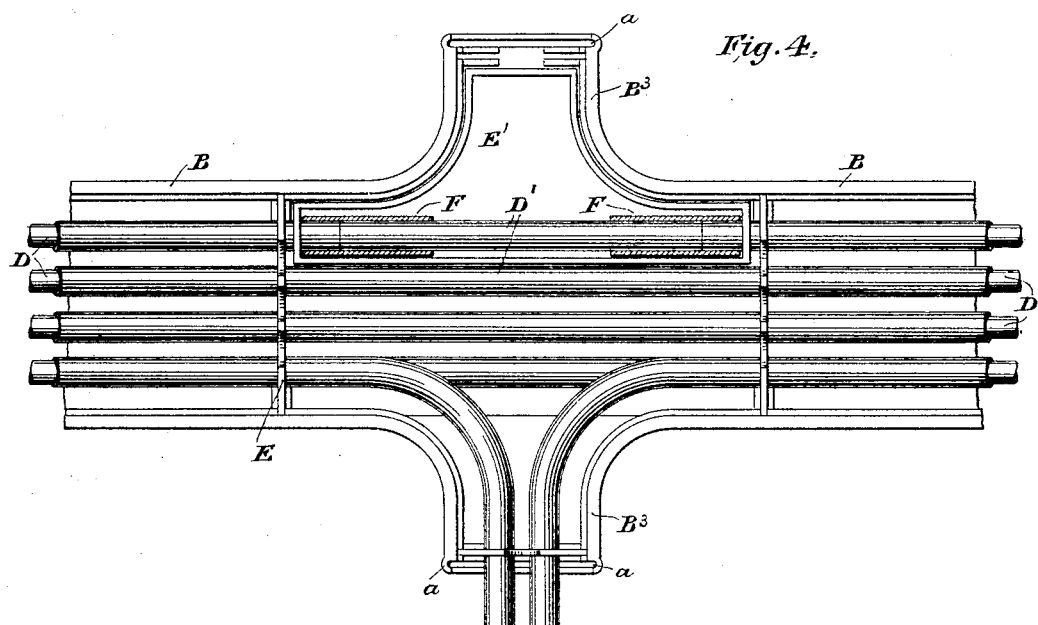

(No Model.) 4 Sheets—Sheet 3.
E. T. GREENFIELD.
ELECTRICAL CONDUIT.
No. 461,677. Patented Oct. 20, 1891.
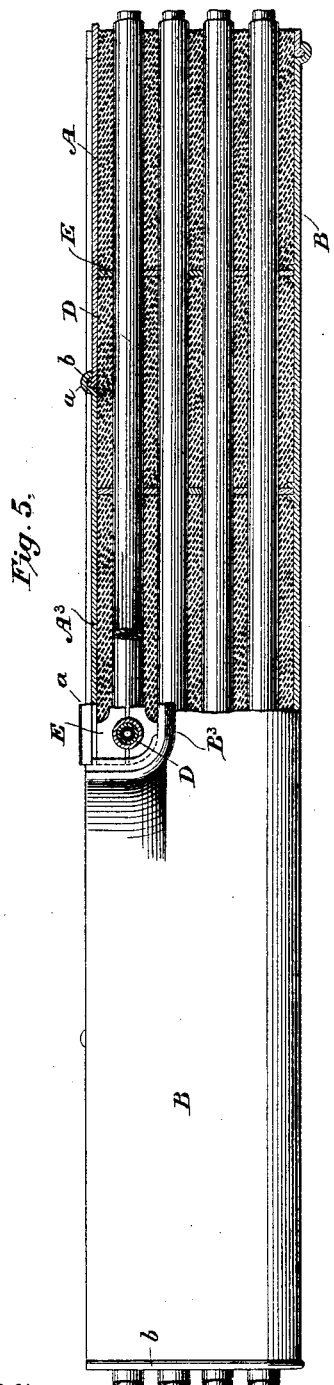
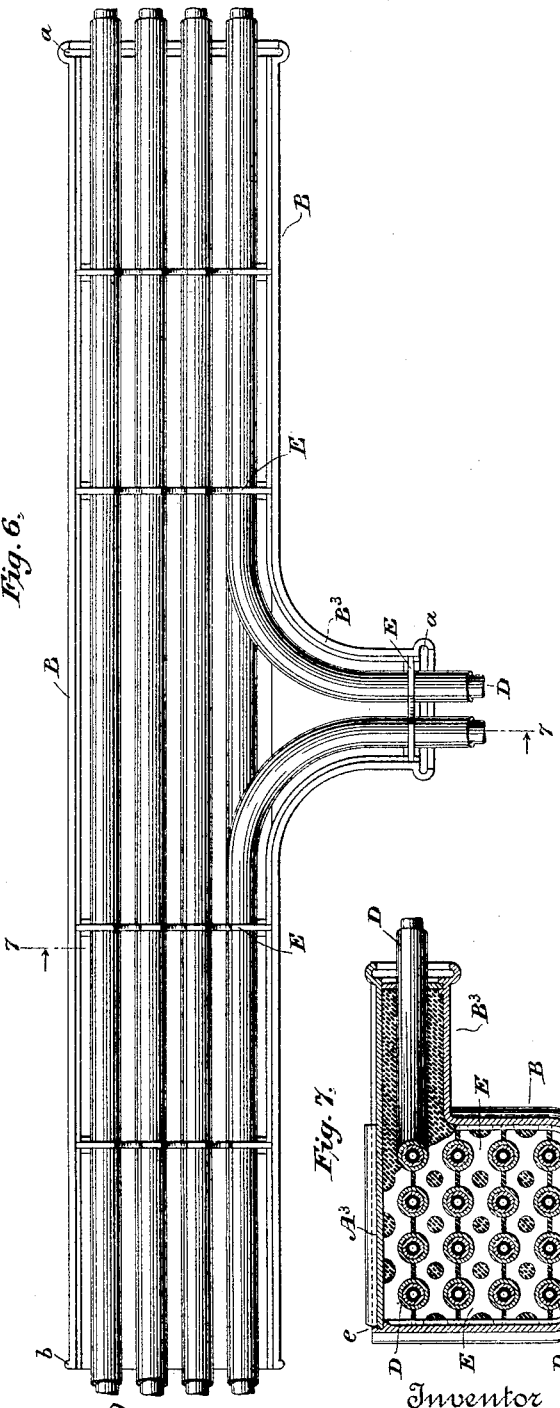
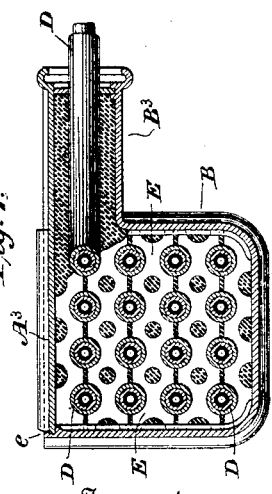
Witnesses
Geo. W. Breck
Henry W. Lloyd
Inventor
Edwin T. Greenfield
By his Attorney
Charles J. Kintner

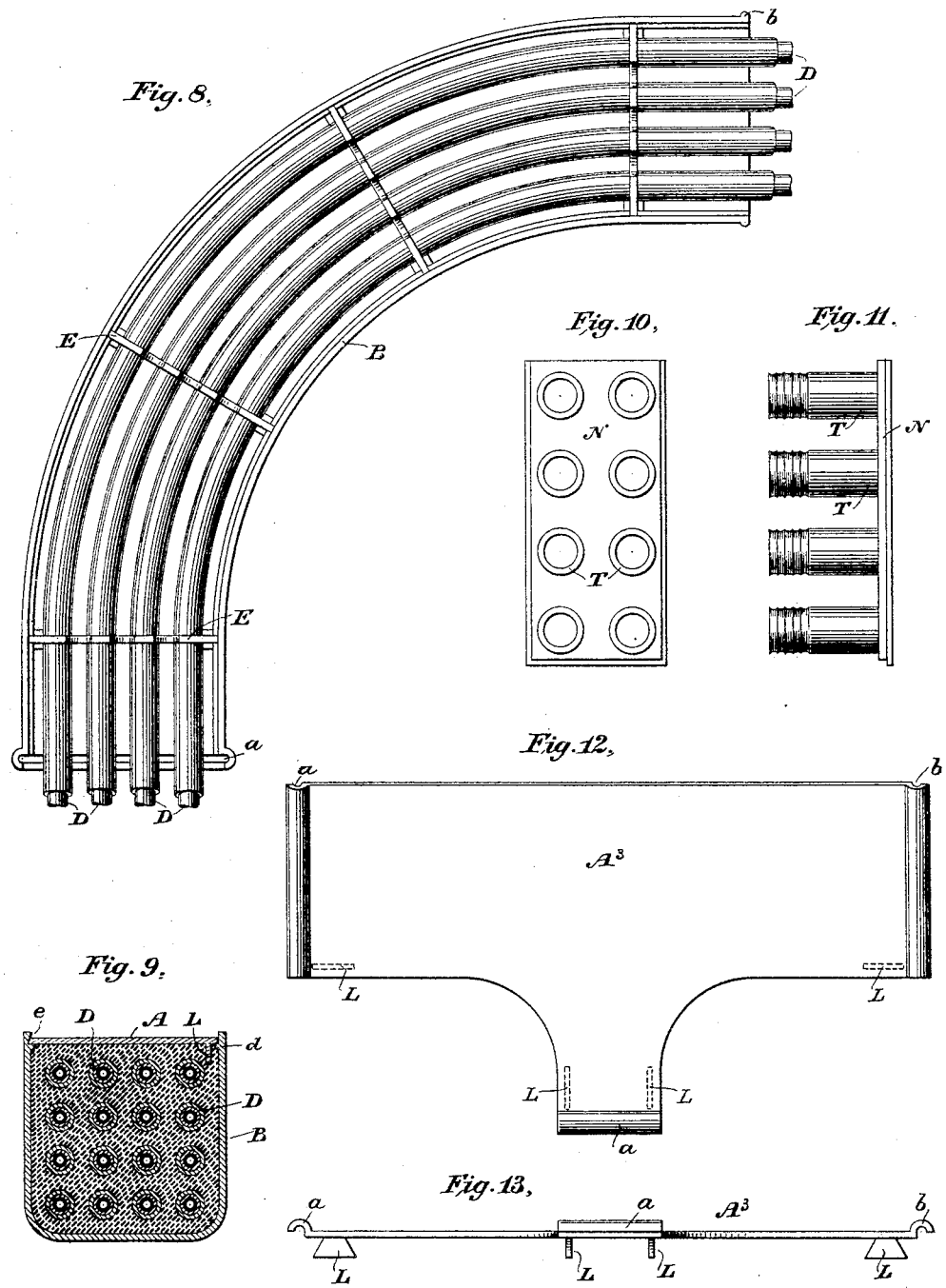

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

ELECTRICAL CONDUIT.

SPECIFICATION forming part of Letters Patent No. 461,677, dated October 20, 1891.

Application filed May 11, 1891. Serial No. 392,313. (No model.)

*To all whom it may concern:*

Be it known that I, EDWIN T. GREENFIELD, a citizen of the United States, residing at New York, in the county and State of New York, have made a new and useful invention in Electrical Conduits, of which the following is a specification.

My invention is directed particularly to improvements in underground conduits, and has for its objects, first, to secure as far as possible perfect insulation of the conductors; second, such an arrangement of all of the elements of a system of this type of conduits that the conductors may be easily placed in position, removed, or repaired, and that branch or side leads may be arranged at stated intervals; third, that the sections of the conduit may be united together by locked joints and that the several features of utility hereinafter pointed out may be accomplished.

My invention will be fully understood by referring to the accompanying drawings, in which—

Figure 1 is a plan view of my improved conduit and a man-hole into which it enters. Fig. 2 is a longitudinal elevational view of the same, parts being shown in section. Fig. 3 is an enlarged plan view of that portion of the conduit passing directly through the man-hole, one of the ducts being shown in section and as having a side or branch outlet. Fig. 4 is an enlarged plan view of the conduit, showing a junction-box and an arrangement for side branches. Fig. 5 is an enlarged elevational view of a section of conduit shown partly in section and illustrating, also, one side branch or duct. Fig. 6 is a plan view as seen looking at Fig. 5 from the top. Fig. 7 is a sectional view of Fig. 5 as seen looking from the left-hand side of the drawing toward the right. Fig. 8 is a plan view of an elbow form of the conduit showing the ducts in position. Fig. 9 is a cross-sectional view of the entire conduit, showing the ducts and lid in position. Fig. 10 is an end view, and Fig. 11 is a side view, of the end plates of each section of the conduit where it is joined to a man-hole. Fig. 12 is a plan view, and Fig. 13 a side elevational view, of one of the covers of that portion of the conduit having a single side branch, as shown in Figs. 6 and 7.

Referring now to the drawings in detail, B represents a section of conduit, made preferably of cast-iron, open on its upper side and provided with a cover or lid A. One end of this section is provided with a female locking portion *a*, and the opposite end with a male portion *b*, adapted to fit therein, each of the sections B being of any preferred length. On the inner face of the upper portion of the section B, on one side, is a beveled notch *e*, and on the other an inwardly-projecting ledge *d*, said notch and ledge extending the entire length of the section and adapted to receive the cover A, provided with downwardly-extending lugs L, these features being shown in cross-section in Fig. 9. At intervals of every two or three feet or more, if desired, are located separating and sustaining plates E, preferably of insulating material, said plates being provided with the necessary openings for spacing and sustaining the ducts D, and being held in vertical alignment by grooves in the walls of the section B, so that when the ducts are in position, as shown in Figs. 2, 5, 6, and 7, they are properly spaced and sustained. At that end of each section of the conduit where it enters a man-hole are located end plates N, having short tubes T, equal in number to the number of ducts which shall comprise the complete conduit, said short tubes T extending inwardly in the man-hole M and constituting the continuation of the several ducts D. The conduit is preferably divided into two branches B' and B² at each man-hole, each of these branches being made of increased depth at that point, as clearly shown in Fig. 2, so that as the ducts enter the man-hole they are equally disposed on opposite sides thereof in such manner as to afford easy access to each individual duct. The lids A' A² of the several sections B' and B² are provided with male and female locking-joints *a b*, substantially similar to those of the sections B, as clearly shown in Fig. 2. The man-hole M is provided with the usual cover C, and also has an outlet-pipe P and grating G, with a light floating valve $t$, adapted, when water accumulates, to rise and permit it to be drawn off through the pipe P.

My improved conduit is constructed as follows: The sections B B', &c., are joined together through the agency of the male and female locking-joints $a\,b$ and properly aligned, the large sections B' B², &c., constituting the entrance ends to each man-hole, and the end plates N being slid into place in the female portion of the sections B' B², located within the inner walls of the man-hole. The spacing-plates E for the bottom tier of ducts D are then laid in place, and the lower tier of ducts is laid in position throughout the entire conduit, each successive layer of ducts being sustained by a corresponding set of spacing-plates, the ends of the several layers of ducts projecting inwardly into the tubes T of the end plates N. After all of the ducts are thus located in position the entire conduit is filled with asphalt or any other preferred form of insulating material in a molten condition to a point on a level with the grooves and ledges $e\,d$, which support the lids A A' A², and while yet in this molten condition the lids are put in position, as shown in Fig. 9, with the lugs L projecting into the molten mass. The asphalt is then allowed to cool, and the lids are thus firmly locked in position by virtue of the grooves or notch $e$ on one side and the lugs L on the opposite side. At each man-hole, therefore, is found inwardly-projecting short tubes T on one side in direct alignment with corresponding short tubes T on the other side, and these are joined together by a series of short tubes D' (see Figs. 1 and 3) and connecting-sleeves S, said sleeves being divided longitudinally in two parts and provided with corrugated ends adapted to fit over the corresponding corrugated ends of the tubes D' and the inwardly-projecting tubes T, the half-sleeves being held together by bolts, as shown. The half-sleeves S on the right, as shown in Fig. 3, are somewhat shorter than are those on the left, the latter being designed to afford a sufficient space between the tubes T and the removable tubes D' to admit of the insertion of side elbow-branches, as shown in cross-section in the upper portion of said figure. The ducts D are preferably of the compound form shown in Fig. 3, but more definitely disclosed in my application for a patent filed in the United States Patent Office on the 21st day of March, 1891, Serial No. 385,889, the same consisting of two concentric tubes of prepared paper or other analogous insulating material spaced by a spirally-disposed cord and united together by a solid mass of pitch, bitumen, or any analogous fusible insulating compound, and the short sections D', located in the man-holes, are of similar construction, the inner portions being adapted to receive either insulated conductors of any well-known form, or bare conductors, if desired, the insulation of the compound tubes, together with the fixed insulated mass within the conduit, being such as to assure an absolute absence of leakage at any point. After the conductors are drawn into position in the ducts and through the short supplemental tubes D', the half-sleeves S are secured in position and bolted together by bolts, as shown.

In Fig. 4 I have shown an arrangement whereby house-circuits or individual service-circuits may be tapped from the main ducts from junction-boxes. E' represents a box, preferably of prepared paper or analogous insulating material, fitting in the junction-boxes or enlarged portion of the conduit and admitting the ends of one of the ducts D with a short section of tube D', and telescoping sleeves F, so that, as shown in said figure, this duct is continuous. The box E is filled, preferably, with some fusible insulating material, such as paraffine, which will fuse at a lower temperature than asphalt, and the lid corresponding to this enlarged portion of the conduit is put in position over said box. When, however, it is desired to tap a house branch, the lid A³ is removed, and, by a blow-pipe or otherwise, the paraffine is melted and drawn out, after which the telescoping sleeves F are moved inwardly and the short section D' removed, elbow-sections being substituted therefor, carrying the conductors to the point of service, as shown in the lower portion of the figure. The box may be then filled again with paraffine and the cover restored.

It will be understood that consecutive segments of the branch conduit $b^3$, Fig. 4, may be located together in sufficient numbers to reach the point of service, whether in direct alignment or by elbow-joints, or both combined.

When it is desired to remove the lids A' A², &c., the upper portion of the conduit is subjected to heat from a blow-pipe or any analogous heating influence, so as to soften the asphalt, after which they may be lifted and the ducts removed or repaired at pleasure.

Having thus described my invention, what I claim, and desire to secure by Letters Patent of the United States, is—

1. A conduit having interlocking sections and covers, in combination with individual spaced ducts surrounded with an insulating mass which unites the ducts and the conduit and holds the covers in place, substantially as described.

2. A conduit having interlocking sections and spaced ducts or tubes united to each other and the conduit by a mass of insulating material, said conduit having removable covers held in place by the mass of insulating material, substantially as described.

3. A conduit having a cover fitting in a groove on one side and held in place by the mass of insulating material which surrounds the ducts or tubes, substantially as described.

4. A conduit having interlocking sections and lids, in combination with spaced ducts surrounded by a mass of asphalt or equivalent insulating material, the lids being held in place by the asphalt, substantially as described.

5. A conduit having removable end plates provided with short tubes extending into a man-hole, in combination with supplemental junction-tubes and divided sleeves, the whole being arranged so as to make the ducts continuous through the man-hole, substantially as described.

6. In a conduit, one or more removable end plates having short tubular projections in alignment with the ducts or conduit-tubes, in combination with supplemental tubes or ducts and divided sleeves provided with means for uniting the supplemental tubes and the tubular projections, so as to make the ducts continuous, substantially as described.

7. A conduit made up of interlocking sections, including a series of individual ducts, said conduit having removable end plates provided with tubular extensions, one for each duct, in combination with supplemental tubes and divided sleeves, said parts being adapted to unite the tubular extensions and preserve the continuity of the ducts, substantially as described.

8. A conduit made up of interlocking sections inclosing continuous individual ducts properly spaced and surrounded by a mass of insulating material, in combination with removable end plates at each man-hole having short tubular extensions, one for each duct, junction-tubes and divided sleeves for uniting the tubular extensions and the junction-tubes, substantially as described.

9. A conduit having a series of ducts permanently located and provided with branch chambers inclosing removable sections, in alignment with the fixed ducts, said branch chambers being filled with an easily fusible insulating medium, substantially as described.

10. A conduit having a series of ducts embedded in a solid mass of insulating material, in combination with branch chambers having removable ducts connecting the fixed ducts, said removable ducts being embedded in an easily fusible material, substantially as described.

EDWIN T. GREENFIELD.

Witnesses:
C. J. KINTNER,
M. L. BUTLER.